Patented Feb. 24, 1948

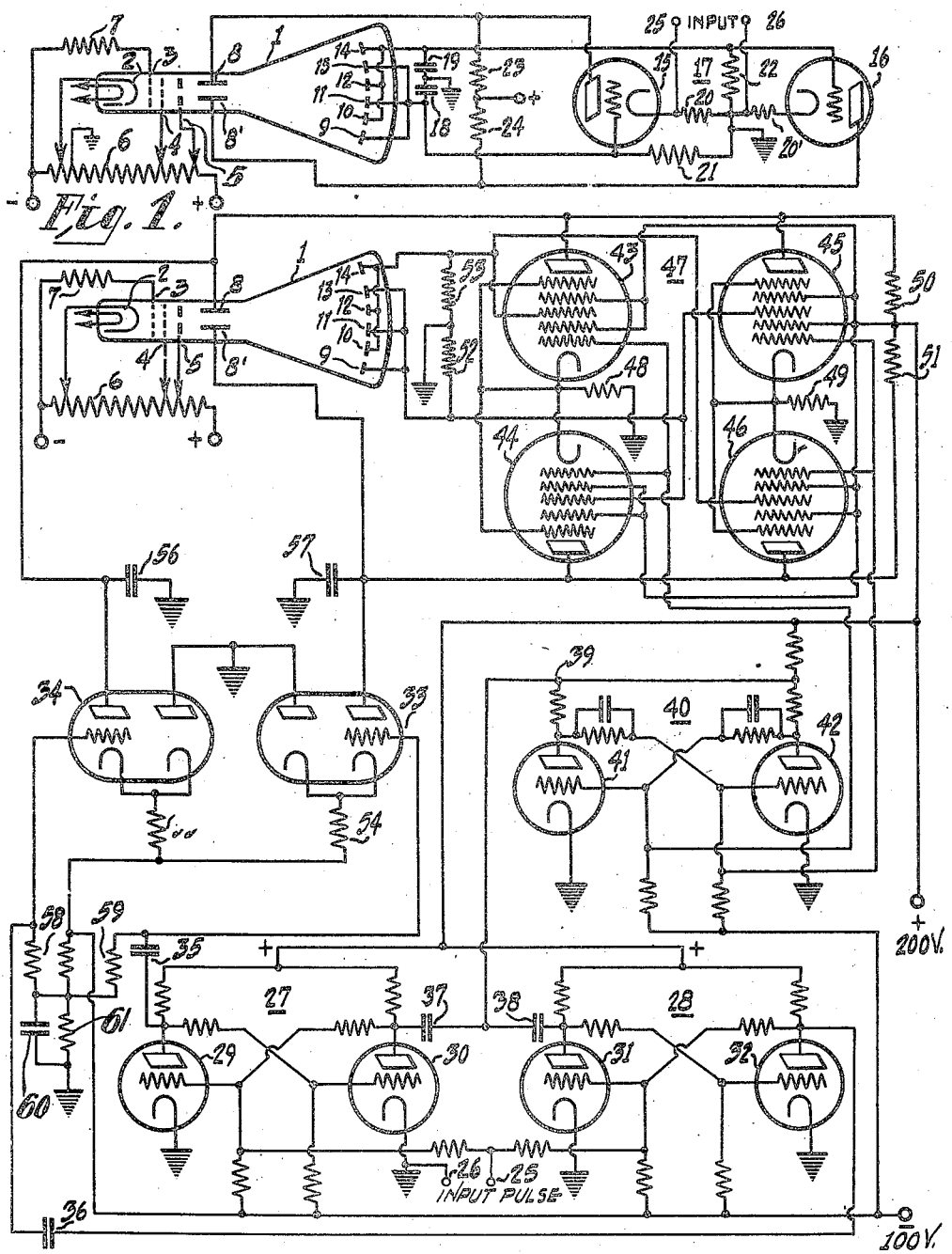

2,436,677

UNITED STATES PATENT OFFICE 2,436,677

INCREMENTAL DEFLECTION OF CATHODE-RAY BEAM

Richard L. Snyder, Jr., Princeton, N. J., assignor to Radio Corporation of America, a corporation of Delaware Application December 31, 1942, Serial No. 470,784

7 Claims. (Cl. 315—21)

This invention relates generally to electronic computers and particularly to an improved method of and means for obtaining incremental deflection of a cathode ray beam in response to applied voltage pulses.

The instant invention is an improvement on applicant's copending U. S. application, Serial No. 455,420, filed August 20, 1942, now abandoned and the copending U. S. application of George A. Morton and Leslie E. Flory, Serial No. 456,012, filed August 25, 1942, which both disclose electronic computing devices employing incremental cathode ray deflection in response to applied voltage pulses. The present invention, however, includes additional advantages and improvements over the copending applications, mentioned heretofore, in that it provides cathode ray deflection of only one increment in response to applied deflection voltage pulses of any amplitude which exceeds a predetermined minimum value. In addition, the direction of the cathode ray deflection is determined by the polarity of the deflecting pulses, whereby the total deflection is proportional to the algebraic sum of the number of applied positive and negative deflecting voltage pulses.

Briefly, the invention employs the general type of feedback circuit, disclosed in the copending Morton and Flory application, for positioning the electron beam to impinge upon the edge of a target electrode after each beam deflection. However, an improved circuit is provided for determining the direction of the beam deflection by the polarity of the applied deflection pulses, and for limiting the beam deflection to a single increment in response to each deflection pulse.

The first embodiment of the invention, to be described hereinafter, employs a cathode ray tube having conventional ray generating and ray deflecting means. A plurality of target electrodes, preferably disposed on a common arc having its center on the beam axis, are spaced predetermined distances from each other. Alternate electrodes are connected together electrically. One group of electrodes is connected to one control electrode circuit of a balanced amplifier, and the remaining group of electrodes is connected symmetrically to another control electrode circuit of the amplifier. The balanced output circuit of the amplifier is connected symmetrically to the deflecting elements of the cathode ray tube. Pulses are applied to the amplifier input circuit in such a manner that the pulse polarity determines the direction of cathode ray deflection. The feedback circuit through the amplifier from the target electrodes to the deflection means accurately positions the cathode ray after each pulse deflection thereof.

The second embodiment of the invention employs a similar cathode ray tube and a balanced amplifier but includes separate deflection circuits which employ trigger circuits responsive to the applied pulses. A first trigger circuit is responsive only to positive applied pulses. A second trigger circuit is responsive only to negative applied pulses, while a third trigger circuit is responsive to actuation of either the first or the second trigger circuits. The first trigger circuit deflects the cathode ray beam one increment in one direction. The second trigger circuit deflects the cathode ray beam one increment in the opposite direction. The third trigger circuit reverses the sense of the balanced amplifier with each applied input pulse, whereby the feedback deflection control voltages are always of the proper polarity to position the cathode ray beam after each incremental deflection thereof. Since the applied voltage pulses only actuate either the first or the second trigger circuits, the cathode ray deflection is independent of the amplitude of the pulses, providing they exceed the minimum value necessary to actuate the trigger circuits.

Among the objects of the invention are to provide an improved method of and means for obtaining incremental deflection of a cathode ray beam. Another object is to provide an improved method of and means for counting voltage pulses. Another object is to provide an improved method of and means for obtaining unitary incremental deflection of a cathode ray beam in response to applied voltage pulses of any amplitude which exceeds a predetermined minimum value. Still another object is to provide an improved method of and means for obtaining unitary incremental deflection of a cathode ray beam in response to applied voltage pulses which exceed a predetermined amplitude wherein the polarity of said pulses determines the direction of the cathode ray beam deflection.

The invention will be described in detail by reference to the accompanying drawing of which Figure 1 is a schematic circuit diagram of one embodiment thereof; and Figure 2 is a schematic circuit diagram of a second and preferred embodiment thereof. Similar reference numerals are applied to similar elements throughout the drawing.

Referring to Figure 1, a cathode ray tube 1 includes a cathode 2, a control electrode 3, a screen electrode 4, and an anode 5 which are supplied with operating voltages from a voltage divider 6. A source of high potential is connected across the voltage divider 6. A resistor 7 is connected between the control electrode 3 and the negative terminal of the voltage divider 6. The tube 1 includes deflecting elements 8, 8' which are disposed adjacent the axis of the cathode ray between the anode 5 and a plurality of target electrodes 9, 10, 11, 12, 13 and 14. The target electrodes 9, 10, 11, 12, 13 and 14 are preferably juxtaposed forming an arc having its center on the axis of the cathode ray beam adjacent the anode 5, and intersecting the plane of the deflected cathode ray beam.

Alternate target electrodes 9, 11 and 13 are connected together and thence connected to the control electrode of a first amplifier tube 15 of a balanced amplifier 17. Similarly, the remaining target electrodes 10, 12 and 14 are connected together and thence connected to the control electrode of a second amplifier tube 16 of the balanced amplifier 17. A first capacitor 18 is connected from the target electrodes 9, 11, 13 to ground. A second capacitor 19 is connected from the target electrodes 10, 12, 14 to ground.

The cathodes of the amplifier tubes 15 and 16 are connected together through resistors 20, 20' which are connected together and grounded at their junction. A first grid resistor 21 is connected from the control electrode of the first amplifier tube 15 to ground. A second grid resistor 22 is connected from the control electrode of the second amplifier tube 16 to ground. Anode potential from any suitable voltage source is applied to the anodes of the amplifier tubes 15, 16 through resistors 23, 24, respectively. The negative terminal of the anode voltage source is connected to ground. The anode of the first amplifier tube 15 is connected to the cathode beam deflecting element 8, while the anode of the second amplifier tube 16 is connected to the beam deflecting element 8'. Input deflection pulses may be applied to the amplifier cathode circuit across the grounded cathode resistor 20, to which the input terminals 25, 26 are connected. The input pulses preferably should be shaped to provide a sawtooth waveform which rises rapidly and diminishes slowly.

The amplifier deflection pulses will thence be applied to the deflection elements 8, 8' to deflect the beam in a direction dependent upon the polarity of the applied pulses. The capacitors 18 and 19 should be selected to have a charging time sufficient to permit the desired deflection increments on the rising part of the pulse before the feedback system can operate. These capacitors should be small enough to allow the feedback system to hold the beam in its new position while the pulse voltage is slowly diminishing.

As pointed out above, the input pulses should be shaped to provide a sawtooth wave which rises rapidly and falls slowly. When such a pulse is of negative polarity and is applied to the input terminals 25—26, the current of tube 15 and the resistor 23 is reduced, the deflecting electrode 8 becomes more positive and the beam moves from the boundary between the target members 11 and 12 to that between the members 13 and 14. During this movement, the target voltage is essentially unchanged because capacitors 18 and 19 cannot be charged by the current in the beam during its transit across the target members 12 and 13. This is so because the amount of charge delivered to the capacitors 18 and 19 by the electrons in the beam during the transit period is very small compared to the charge necessary to produce an appreciable voltage change across these capacitors.

The voltage of the pulse falls from its maximum value at a fairly uniform rate and reaches zero in a time which is much greater than that required for its rise. During this relatively slow decrease in voltage, the electron beam starts to move from the boundary between the target members 13 and 14 onto the member 13. As this movement is relatively slow, the beam current to the member 13 has time to charge the capacitor 18 negative and the lowering of the current to the member 14 and capacitor 19 continues for sufficient time to allow the charge of capacitor 19 to become less negative. These voltage changes of the capacitors 18 and 19, which are connected to the grids of the tubes 15 and 16, thus change in such a way as to reestablish the beam at the boundary between the members 13 and 14 where it is stabilized by reason of the fact that the beam is divided between these two members. Under these conditions, the currents of the tubes 15 are balanced and further movement of the beam requires the application of an additional pulse to the input terminals 25—26.

If this additional pulse be positively polarized, the current of the tube 15 and resistor 23 is increased, the polarity of the deflecting electrode 8 becomes more negative and the electron beam is moved from the boundary between 13 and 14 to the boundary between 11 and 12. During this movement, the target voltage is essentially unchanged, as pointed out above. As the applied pulse voltage slowly falls to zero, the beam starts to move from the boundary line between the members 11 and 12 onto the member 12, the charge of the capacitor 19 tends to become more negative and that of the capacitor 18 tends to become less negative, the current of the tube 16 tends to decrease and that of the tube 15 tends to increase, and the beam is stabilized at the boundary between the members 11 and 12, as previously explained.

The application of a further positive pulse results in movement of the beam to the boundary line between the target members 9 and 10, where it tends to move onto the segment 10, thus making the charge of the capacitor 19 more negative and that of the capacitor 18 less negative, and stabilizing the beam at the boundary line between the members 9 and 10.

As previously indicated, the target members are insulated and spaced from one another. A construction found satisfactory was the arrangement of the members in the form of a partly opened Venetian blind so that the opposed edges of the members overlapped without touching one another.

The arrangement of Fig. 2 differs from that of Fig. 1 in that the positive and negative pulses are applied to different trigger circuits of the slideback type and the electron beam is stabilized at every target boundary instead of every other target boundary, as in the case of Fig. 1 where both the positive and negative pulses are applied to the same terminals. In other respects, the operation of the embodiments of Figs. 1 and 2 is similar.

Referring to Figure 2, the cathode ray tube is connected similarly to the tube of Fig. 1 with the exception of the target electrode groups and the beam deflection elements. Input pulses applied to the terminals 25, 26 are impressed upon two trigger circuits 27, 28. These trigger circuits are of the "slideback" type described in the copending application of George A. Morton and Leslie E. Flory, Serial No. 473,146, filed January 21, 1943, now Patent No. 2,404,047, granted July 16, 1946. The trigger circuit 27 includes a first trigger tube 29 and a second trigger tube 30, which is normally non-conducting. The trigger circuit 28 includes a first trigger tube 31, which is normally non-conductive, and a second trigger tube 32 which is normally conductive. Input pulses are applied to the grid of the first trigger tube 29 of trigger circuit 27, and to the grid of the first trigger tube 31 of trigger circuit 28. Thus negative pulses applied to the input terminals 25, 26 will temporarily recondition the trigger circuit 27, while positive pulses will temporarily recondition the trigger circuit 28. A negative input pulse of any amplitude which exceeds some predetermined minimum value will therefore produce a positive pulse in the anode circuit of the first trigger tube 29 of trigger circuit 27. This positive pulse is applied, through a first capacitor 35, to the control electrode circuit of a first triode of a diode-triode 33, from which is derived a negative pulse which is applied to the cathode ray tube deflecting element 8' to deflect the cathode beam upward a predetermined vertical increment determined only by the circuit constants.

Similarly, a positive pulse applied to the input terminals 25, 26 will produce a positive pulse in the anode circuit of the second trigger tube 32 of the second trigger circuit 28. This positive pulse is applied, through a second capacitor 36, to the control electrode of a second triode of a second diode-triode 34, from which is derived a negative pulse which is applied to the cathode ray tube deflecting element 8 to deflect the beam downward the predetermined increment determined only by the circuit constants.

The anodes of the trigger tubes 30 and 31 are connected, respectively, through third and fourth capacitors 37 and 38 to the symmetrical point 39 of the anode circuits of a third trigger circuit 40, including first and second trigger tubes 41, 42, which is of the conventional type also described in the Morton and Flory patent, mentioned heretofore. Input pulses of either polarity will provide negative pulses at the point 39 to effect a change in polarization of the third trigger circuit 40.

A balanced amplifier 47, includes four pentagrid tubes 43, 44, 45, 46. The cathodes and suppressor grids of the pentagrid tubes 43 and 44 are all connected to ground through a first cathode resistor 48. The cathodes and suppressor grids of the pentagrid tubes 45 and 46 are similarly connected to ground through a second cathode resistor 49. The screen and anode electrodes of all four pentagrid tubes are supplied with operating voltage through a network which includes the resistors 50, 51. The anodes of the tubes 43 and 45 are connected to the cathode ray deflecting element 8. The anodes of the tubes 44 and 46 are connected to the cathode ray deflecting element 8'.

The target electrode 9, 11 and 13 are connected together, and connected to the second control electrodes of the pentagrid tubes 44 and 45. A grid resistor 52 is connected from these grids to ground. Similarly the target electrodes 10, 12 and 14 are connected together, and connected to the second control electrodes of the pentagrid tubes 43 and 46. A second grid resistor 53 is connected from the last mentioned grids to ground.

The first control grids of the pentagrid tubes 43 and 44 are connected to the grid of the first trigger tube 41 of the third trigger circuit 40. Similarly the first control grids of the pentagrid tubes 45 and 46 are connected to the grid of the second trigger tube 42 of the third trigger circuit 40. It will therefore be seen that the balanced amplifier 47 provides a feedback deflection control circuit for the cathode ray tube 1, and that the sense of the amplifier 47 is changed by each impulse to effect a balance of the beam on the next boundary between target electrodes.

It should be understood that the invention lends itself to both magnetic and electrostatic types of cathode ray deflection, and that either may be employed.

The anodes of the diode portions of the first and second diode-triodes 33 and 34 are connected to ground. The cathodes of each of the diode-triodes are connected together and to a source of negative bias potential through separate cathode bias resistors 54, 55, respectively. This arrangement insures that the current drawn by the triode will be independent of the tube characteristics, so that the charge delivered to either capacitor 56 or 57 during a deflection pulse depends only on the duration of the pulse. The duration of the pulse is determined by the constants of the capacitors 36 and 35 in conjunction with the constants of their respective cooperating resistors 58 and 59 which are connected together, and connected through a capacitor-resistance network 60, 61 to ground.

Deflection capacitors 56, 57 are connected between the deflection elements 8, 8', respectively, and ground, to insure that the deflection increment in response to the input pulses is completed, before the deflection feedback voltages from the balanced amplifier 47 take effect, to position the cathode ray beam on the corresponding target electrode.

Thus the invention described comprises improved methods of and means for deflecting a cathode beam in discrete steps in a direction determined by the polarity of applied voltage pulses, wherein the deflection increment is substantially independent of the amplitudes of the applied voltage pulses.

I claim as my invention:

1. A cathode ray tube circuit for counting voltage pulses including a cathode ray tube having ray generating means, ray deflecting means, and a plurality of target electrodes, means connecting alternate target electrodes in separate parallel groups, means including a balanced amplifier for applying said pulses to said ray deflecting means to deflect said ray across said target electrodes, means including said target electrodes and said amplifier for accurately positioning said ray with respect to the next adjacent one of said target electrodes after each application of one of said pulses to said deflecting means, and means for controlling the direction of said deflection in accordance with the polarity of each of said pulses.

2. A cathode ray tube circuit for deflecting a cathode ray in single discrete steps and a direction corresponding to the polarity of applied voltage pulses including a cathode ray tube having ray generating means, ray deflecting means, and a plurality of target electrodes, means connecting alternate target electrodes in parallel relation, a pair of balanced amplifiers, means for applying said pulses symmetrically to said amplifier, means connecting each group of said target electrodes to a different one of said amplifiers, and means connecting said amplifiers to different ones of said deflecting means for applying said pulses thereto to deflect said ray across said target electrodes.

3. A cathode ray tube circuit for deflecting a cathode ray in single discrete steps in a direction corresponding to the polarity of applied voltage pulses including a cathode ray tube having ray generating means, ray deflecting means, and a plurality of target electrodes, means connecting alternate target electrodes in parallel relation, a balanced amplifier, means including a pair of trigger circuits for selectively applying said pulses to said deflecting elements, means connecting each group of said target electrodes to different tubes of said amplifier, and means connecting said amplifier to said deflecting means to provide a feed-back circuit to deflect said ray across said target electrodes.

4. A cathode ray tube circuit for deflecting a cathode ray in single discrete steps in a direction corresponding to the polarity of applied voltage pulses including a cathode ray tube having ray generating means, ray deflecting means, and a plurality of target electrodes, means connecting alternate target electrodes in parallel relation, a balanced amplifier, means including a pair of trigger circuits for selectively applying said pulses to said deflecting elements, means including a third trigger circuit for selectively applying said pulses to different tubes of said amplifier, means connecting each group of said target electrodes to different tubes of said amplifier, and means connecting said amplifier to said deflecting means to provide a feedback circuit to deflect said ray across said target electrodes.

5. A cathode ray tube circuit for deflecting a cathode ray in single discrete steps in a direction corresponding to the polarity of applied voltage pulses including a cathode ray tube having ray generating means, ray deflecting means, and a plurality of target electrodes, means connecting alternate target electrodes in parallel relation, a balanced amplifier, means including a pair of trigger circuits and a pair of diode-triodes for selectively applying said pulses to said deflecting elements, means including a third trigger circuit for selectively applying said pulses to different tubes of said amplifier, means connecting each group of said target electrodes to different tubes of said amplifier, and means connecting said amplifier to said deflecting means to provide a feedback circuit to deflect said ray across said target electrodes.

6. Apparatus of the type described in claim 5 including a pair of capacitors, a source of reference potential, and means connecting each of said deflecting means through one of said capacitors to said source of reference potential.

7. A cathode ray tube circuit for deflecting a cathode ray in single discrete steps in a direction corresponding to the polarity of applied voltage pulses including a cathode ray tube having ray generating means, ray deflecting means, and a plurality of target electrodes, means connecting alternate target electrodes in parallel relation, a balanced amplifier including parallel push-pull connected pentagrid tubes, means including a pair of trigger circuits for selectively applying said pulses to said deflecting elements, means including a third trigger circuit for selectively applying said pulses to different tubes of said amplifier, means connecting each group of said target electrodes to different tubes of said amplifier, and means connecting said amplifier to said deflecting means to provide a feedback circuit to deflect said ray across said target electrodes.

RICHARD L. SNYDER, Jr.

REFERENCES CITED

The following references are of record in the file of this patent:

UNITED STATES PATENTS

| Number | Name | Date |
|---|---|---|
| 2,337,272 | Roberts | Dec. 21, 1943 |
| 1,932,637 | Richardson | Oct. 31, 1933 |
| 2,224,677 | Hanscom | Dec. 10, 1940 |
| 2,265,216 | Wolf | Dec. 9, 1941 |
| 1,779,748 | Nicolson | Oct. 28, 1930 |
| 2,036,350 | Montani | Apr. 7, 1936 |
| 2,097,392 | Finch | Oct. 26, 1937 |
| 2,287,296 | Dallos | June 23, 1942 |